July 18, 1961  A. EDELMAN  2,992,731
INSTALLATION FOR INSPECTING ARTICLES
Filed March 21, 1957  4 Sheets-Sheet 3

A— PACKAGE POSITION DETECTOR SIGNALS, E.G. LIGHT RECEIVED INTO PHOTOELECTRIC POSITION DETECTOR. 

B— PACKAGE POSITION DETECTOR SNAPPER OUTPUT VOLTS. 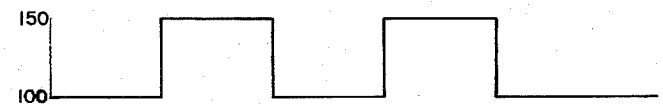

C— PACKAGE POSITION DETECTOR PULSE FORMER OUTPUT VOLTS. 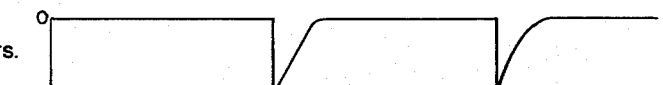

D— PULSE GATE OPERATION. 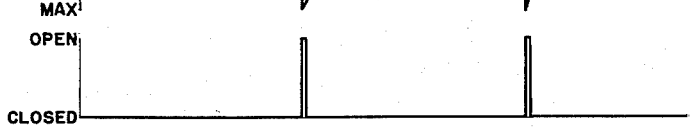

E— PACKAGE CONTENTS DETECTOR BRIDGE UNBALANCE SIGNALS ENTERING PULSE GATE. 

F— SIGNALS PASSING THROUGH PULSE GATE AND ENTERING AMPLITUDE GATE. 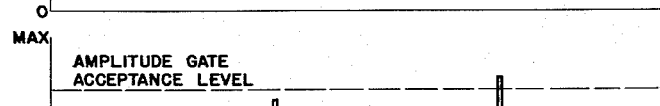

G— SIGNALS OPERATING AMPLITUDE GATE TO OPEN IT AND OPERATE DEFLECTOR GATE SNAPPER. 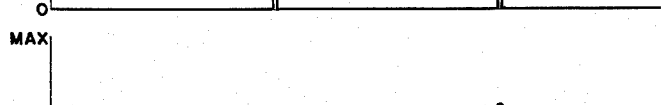

H— DEFLECTOR SNAPPER AND RESET OPERATION. 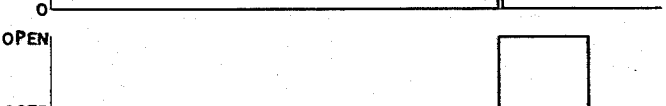

I— PACKAGE DEFLECTOR OPERATION. 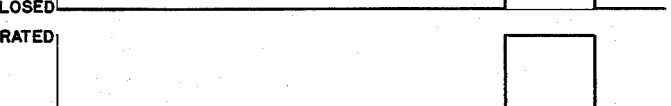

FIG. 3

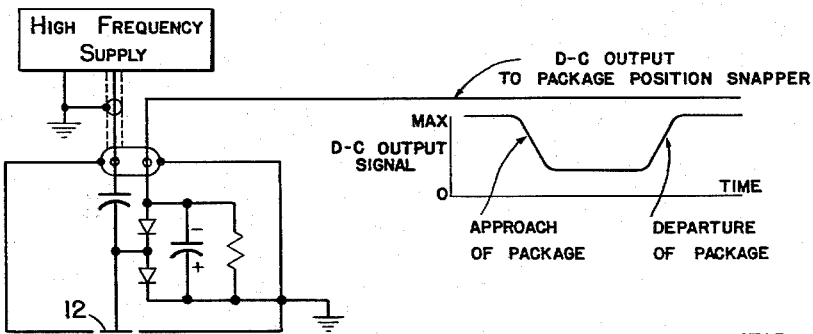

FIG. 4

INVENTOR.
ABRAHAM EDELMAN
BY
ATTORNEYS

July 18, 1961
A. EDELMAN
2,992,731
INSTALLATION FOR INSPECTING ARTICLES
Filed March 21, 1957
4 Sheets-Sheet 4
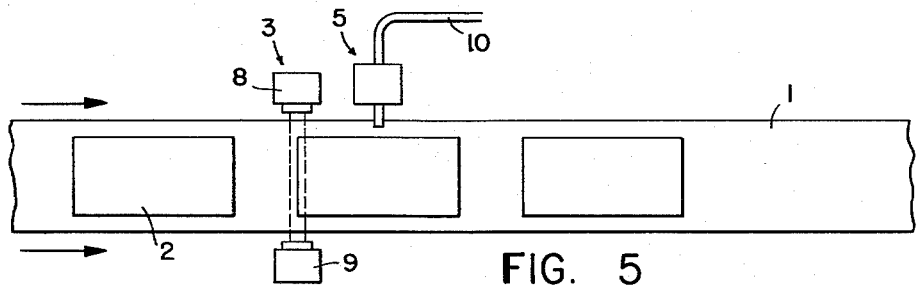
FIG. 5
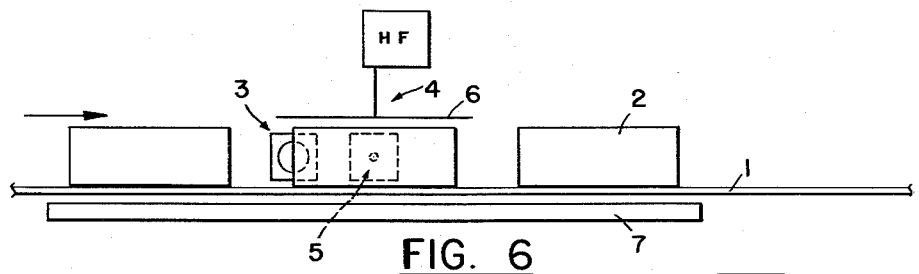
FIG. 6
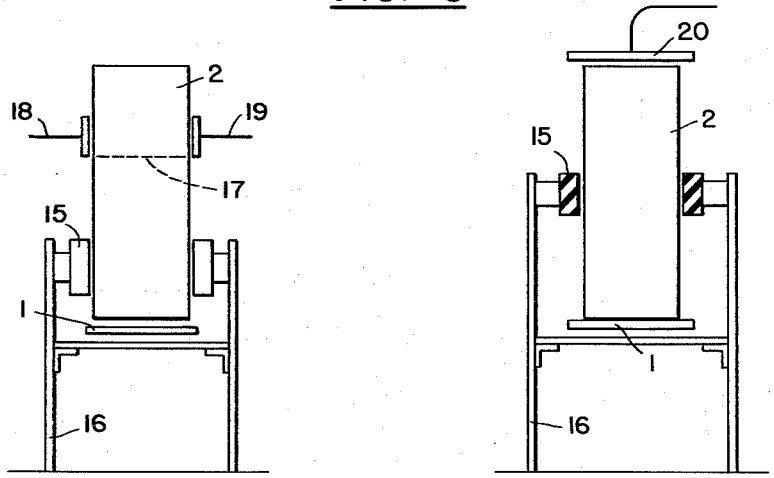
FIG. 7
FIG. 8
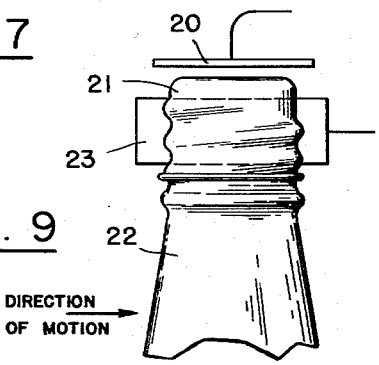
FIG. 9
DIRECTION OF MOTION →
*INVENTOR.*
ABRAHAM EDELMAN
BY Hane and Nydick
ATTORNEYS

United States Patent Office 2,992,731
Patented July 18, 1961

2,992,731
INSTALLATION FOR INSPECTING ARTICLES
Abraham Edelman, 43 Vesey St., New York 7, N.Y.
Filed Mar. 21, 1957, Ser. No. 647,673
13 Claims. (Cl. 209—81)

The present invention relates to an installation for supervising or inspecting articles for a deviation from a selected standard and for automatically rejecting articles the deviation of which from the standard exceeds a predetermined range. Such supervisory installations are used in association with production or conveyor lines for transporting a succession of articles all of which should be substantially uniform in every respect, or at least in respect to selected properties.

Supervisory installations of the general kind above referred to, as heretofore known, are slow in operation, expensive and rather limited as to their field of application.

One of the objects of the present invention is to provide a novel and improved supervisory or detecting installation which is capable of inspecting a wide variety of packaged or unpackaged articles for uniformity. The articles to be inspected may be completely or partly manufactured articles made of metallic and/or non-metallic material, but they may also be products of nature. Among the many manufactured articles that are suitable for inspection by means of an installation according to the invention, may be mentioned containers or bottles as to the level of the liquid or solid contents, packaged articles as to the presence or absence of wanted or unwanted items in the package or as to the presence of the correct number of items, articles such as ball bearings as to diameter, or articles such as tools, knives and razor blades as to the keenness of the edge, or the presence or absence of packaging materials. Among the products of nature that are suitable for inspection may be mentioned, citrus and other fruits of approximately regular geometrical configuration as both size and juice contents of such fruits will affect the response of the installation. It should be emphasized that the above listing of articles and products is by no means complete, but represents only a small percentage of the inspections which may be successfully carried out with an installation according to the invention.

Another object of the invention is to provide a novel and improved supervisory installation which is highly sensitive to deviations from a selected range of standard and which completes the inspection of each article or product passing through the installation practically instantaneously. This affords the advantage that a conveyor or production line along which the supervisory installation is installed, may be run at the rate of speed normal for the production of the articles involved.

Still another object of the invention is to provide a novel and improved supervisory installation in which an article detected to deviate from a given standard by more than a predetermined range is treated differentially from an article within the range of uniformity. Substandard articles or products may for instance, be marked or automatically removed from the conveyor which guides the articles or products through the installation.

A further object of the invention is to provide a novel and improved supervisory installation in which the inspection of an article and the removal or other special treatment of a substandard article are so correlated that there is no danger of damage to the inspection equipment proper by contact with a substandard article during the removal thereof.

The concept of the invention is based upon utilizing high frequency current and passing such current through the entire article or product to be inspected. The use of high frequency current has been found to be advantageous as all materials respond to high frequency current in proportion to their electrical properties and the quantity of the material that is present. Furthermore, some materials conduct the current more efficiently than others. This affords the advantage that an installation can be readily designed which discriminates among the materials present in a packaged or unpackaged article whereby responses may be obtained for a great variety of articles indicating whether certain materials are present or absent and whether they are present in a desired quantity.

A supervisory installation according to the invention comprises, at least functionally, three stations, namely, a preparatory or triggering station, a detecting or inspection station and a station for special treatment such as removal of a substandard article. The triggering station which is the one first reached, serves to ready the inspection station for an inspecting operation.

Other and further objects, features and advantages of the invention will be pointed out hereinafter and set forth in the appended claims forming part of the application.

In the accompanying drawing several preferred embodiments of the invention are shown by way of illustration and not by way of limitation.

In the drawing:

FIG. 3 shows graphs of the discriminating signal shapes initiated by an article passing through the installation and causing removal or other special treatment of a substantial article.

FIG. 4 is a circuit diagram showing a modification of part of the circuit diagram of FIG. 3.

FIG. 5 is a diagrammatic plan view of the installation.

FIG. 6 is a diagrammatic elevational view of FIG. 5.

FIG. 7 is a diagrammatic view of an electrode arrangement in the inspecting station for detecting the level of the contents in a container.

FIG. 8 is a diagrammatic view of an electrode arrangement in the detecting station for detecting the density of the contents of a container, and FIG. 9 is a diagrammatic view of an electrode arrangement in the detecting station for detecting the absence of a wanted component of an article.

Referring now to the figures in detail, FIGS. 5 and 6 show a conveyor belt 1 of suitable design which should be visualized as conveying products or articles to be inspected indicated as packages 2 past the inspection installation; the belt is presumed to travel in the direction of the arrows. As previously mentioned, the installation comprises a preparatory or triggering station generally designated by 3, a detecting or inspection station generally indicated by 4 and a removal or ejection station designated by 5 for ejecting or marking substandard articles.

The function of the preparatory station is to detect an article when it reaches a predetermined position relative to the installation and to initiate signals which trigger the inspection station 4 for an inspecting operation. The article position detecting station may be of the photoelectric type (see for example FIG. 2), or of the high frequency current type (FIG. 4). No fixed spacing between two successive articles to be inspected is required, but there should be a minimum spacing such that the light of the beam can pass between two successive articles.

The networks and components as such which are utilized in the installation, are generally of conventional design and the invention resides in a novel combination and utilization of the networks and components.

Figure 1:
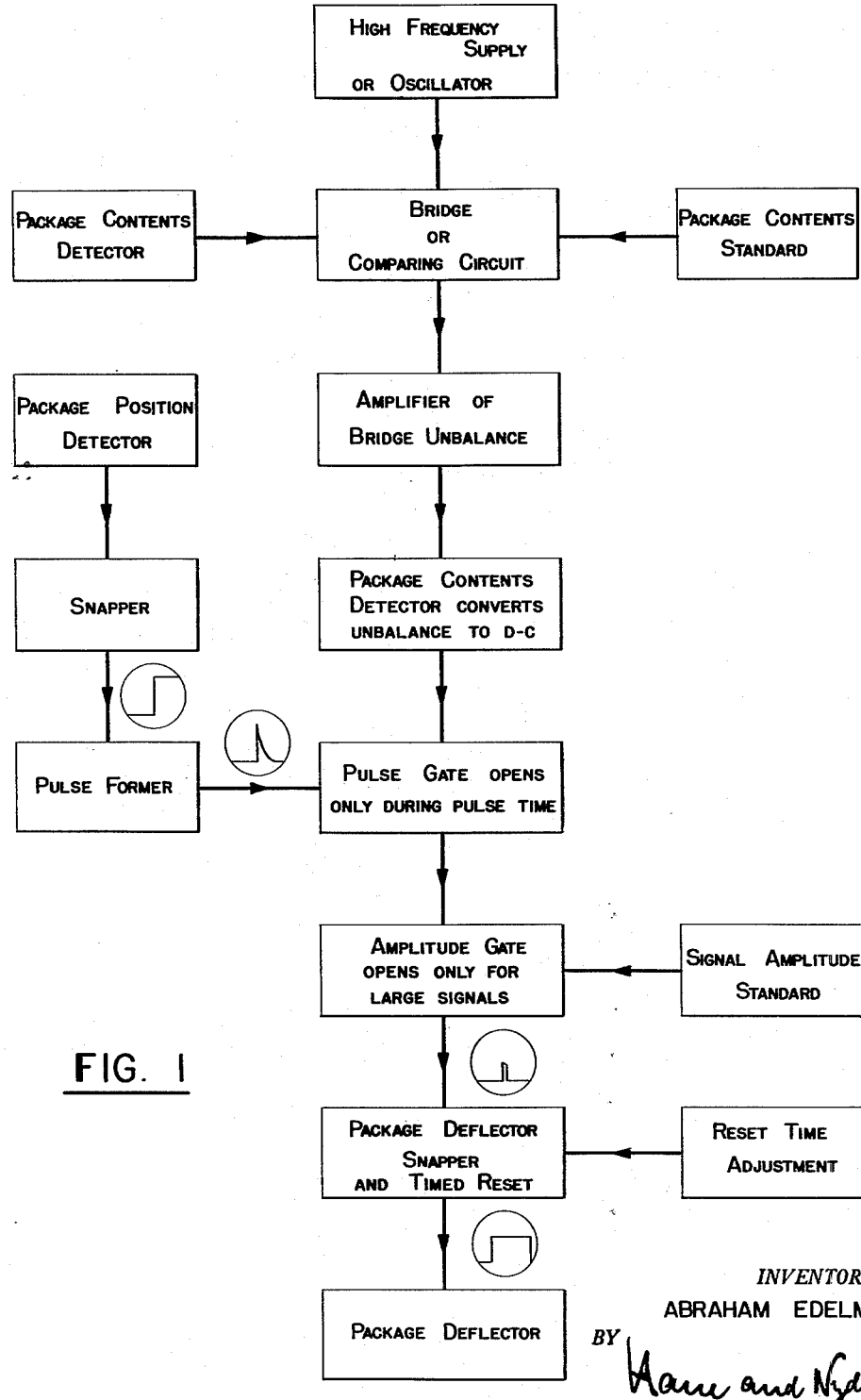
FIG. 1 is a block diagram of the installation.
Figure 2:
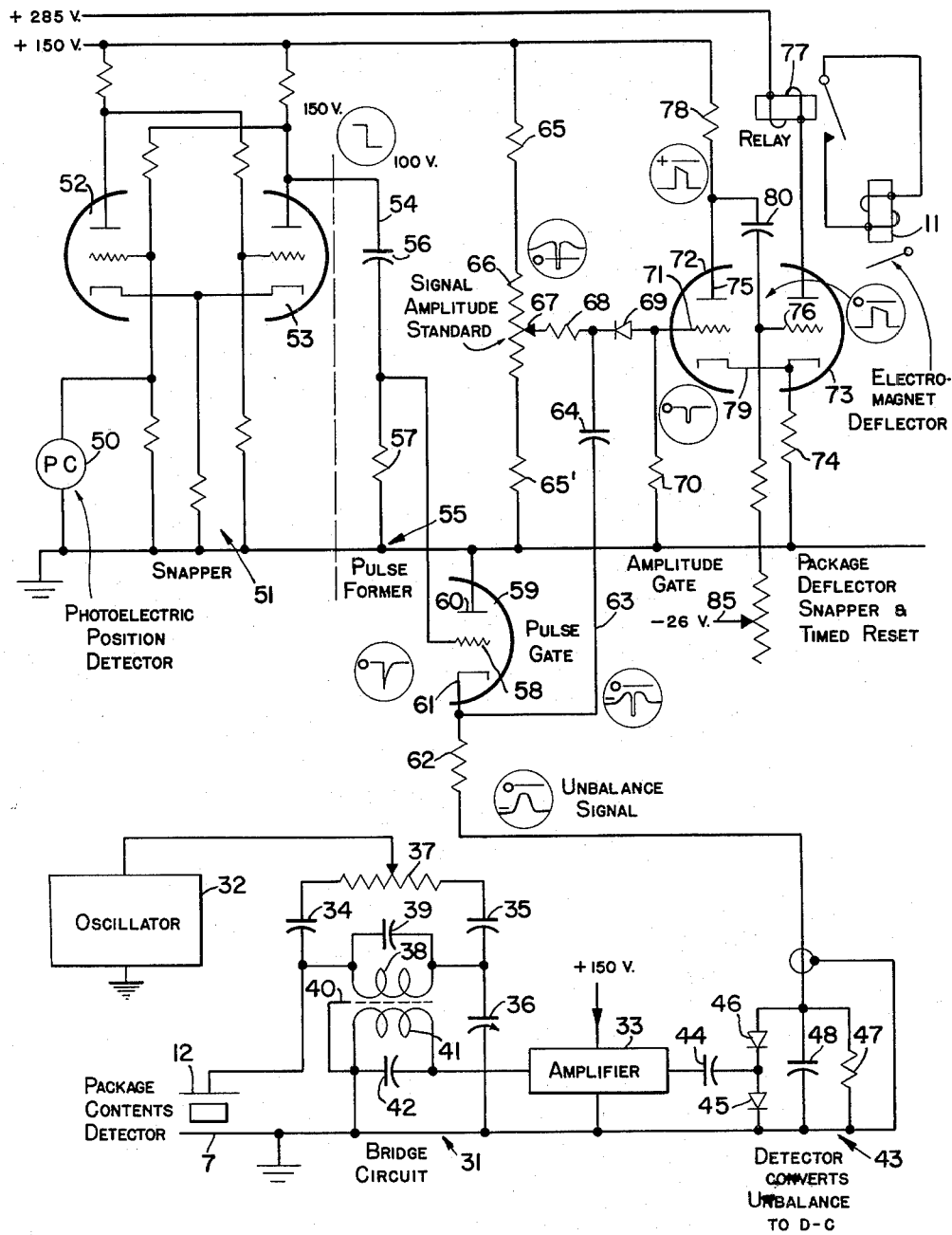
FIG. 2 is a typical circuit diagram of the installation.

Referring now to FIGS. 1, 2 and 3, it is believed that the circuit systems of the installation and the functions thereof are fully apparent from a review of these figures and the legends appearing therein.

The inspection proper is effected by means of a comparing or bridge circuit 31 energized from an oscillator 32 and feeding its output into an amplifier 33. The bridge circuit is conventional as shown, comprising four arms which are essentially capacitors 34, 35, 36 and the inspection station capacitor formed by an electrode 12 and ground 7. To assist in accurate balancing, capacitor 36 is made adjustable and a potentiometer 37 is provided in series with capacitors 34 and 35 in a manner known in this art. The output of this bridge circuit enters output transformer primary 38, tuned to resonance with the frequency of oscillation by a capacitor 39 so that it responds efficiently only to that frequency. The transformer secondary 41 is electrostatically shielded from the primary by a grounded screen 40, and is also tuned to resonance at the same frequency by a capacitor 42. By such tuning, the bridge circuit is allowed to remain lightly loaded by the output load and the output of the secondary is suitable for application to any conventional amplifier 33.

The amplifier output is coupled to a detector 43 through a capacitor 44, and is a standard type consisting of diodes 45, 46 feeding load resistor 47 filtered by capacitor 48. This detector removes most of the oscillator frequency signal, leaving a signal current that is essentially D.-C., but which follows variations in the amplitude or envelope of the bridge output at oscillator frequency, as is well-known for detectors.

The bridge circuit is adjusted by capacitor 36 and potentiometer 37 to be in the balance or substantially in balance when the electrical characteristics of the inspected article are within a predetermined range in relation to the standard electrical characteristics, but to become sufficiently unbalanced to activate the removal station later to be described, when the difference between the compared characteristics is more than the predetermined range. One selected mode of balance and unbalance is shown at the small insert labelled "unbalance signal" in FIG. 2, in correct polarity. It is also shown without regard to polarity in FIGS. 3 and 4. Referring now particularly to FIG. 3 at E, the signal shown there is without polarity since it is sometimes preferable to use either polarity, and it is also shown once for a "standard" package and again for a "substandard" package. It will be observed that the signals differ in amplitude; and it is that difference that the entire system is asked to discover and employ for automatic sorting.

In this connection it should be pointed out that the detection is an entirely electronic test employing high frequency current and that in a test of this kind the bridge will become unbalanced not only in response to improper capacitance values introduced by the presence of the inspected article (due for instance to a low liquid level in a container), but also in response to improper electrical losses for instance, due to a resistance value either too high or too low introduced by the presence of the inspected article.

The position-detecting preparatory station 3 shown best in FIGS. 5 and 6 comprises a light projector 8 and a light receiver 9, in the form of a photocell 50. When an article 2 passes through station 3, it will first cut off the light beam and then restore it. The photocell 50 and the circuits connected thereto are so arranged that they are activated upon the restoration of the light beam following darkening of the photocell. Such an arrangement is preferred because it facilitates removal of a detected substandard article, since the article will have moved out of the station 3 at this time.

Let it now be assumed that article 2 has reached a position in which the light beam is being restored, and return to FIG. 2. The photocell 50 is connected to one side of a snapper 51 which is a form of multivibrator or squaring circuit well known in the art. This snapper comprises two triode amplifier sections 52, 53 which are so coupled to each other as to permit the presence of only two conditions, as follows: either the output wire 54 is at 150 volts, corresponding to triode 53 being cut off completely, or it is at 100 volts, corresponding to triode 53 being in the conducting state. Such circuits are commercially available as packaged assemblies and are employed here to convert a photocell signal which might at times be of a slowly-changing character, as illustrated in FIG. 3 at A, into a signal which is sure to be of a rapidly-changing character, as illustrated at B. This is also illustrated by the small inserted figure shown near wire 54 of FIG. 2.

Such rapidly-changing wavefront is not directly obtainable from a photocell and affords the advantage that the fast wave front signals can be passed through the circuit system to follow, to the exclusion of all other signals that are of slower wave front. The fast wave front signal is the one that is used in connection with the inspection proper. It is fed to a "pulse former" circuit 55, comprising capacitor 56 and resistor 57, and converting the signal from a "step" to a "pulse," as now shown in FIG. 3 on line C. This representation of the output pulse shows the approximate voltage output of the pulse former 55, as furnished to grid 58 of pulse gate 59. The values of the resistor 57 and capacitor 56 are selected to give a time-constant of approximately one millisecond.

When the article under inspection has reached the position in which it restores the light beam thereby initiating the aforesaid signals, it is also in the correct position for the inspection proper. That is, it is located in a selected central position along the conveyor and between electrode 12 and ground 7; and the high-frequency current is then passing through the article. While the article is here, the snapper and pulse former perform their functions, and a brief output pulse is given for a period of time that is so short that the article may be thought of being essentially stationary during this pulse.

The pulse gate tube 59 is a triode which is normally in the conducting state since the plate 60 is at ground potential while cathode 61 is at a negative potential due to the selected polarity of the diodes 45, 46 of the detector 43, and since the grid 58 is normally also at about ground potential. However, during the brief period of the pulse aforementioned, the grid 58 is brought to a negative potential of about 50 volts, and this is adequate for making pulse-gate tube 59 non-conducting during the period of the pulse.

The operation of the pulse-gate tube 59 is best understood by considering the tube as a variable resistor, since the circuit through the cathode-plate of this tube is normally of low resistance, then changes briefly to a high resistance. The resistor 62 in series with the tube is selected to be large in resistance compared to the plate resistance of the tube in the conducting state. The input to the pulse gate tube is the voltage applied from detector 43, and termed the "unbalance signal." This voltage is applied to resistor 62 in series with plate resistance of pulse-gate tube 59; and since resistor 62 is much larger than the plate resistance, most of the input voltage is found to be across resistor 62 and very little of it is found to be across the plate resistance of the tube. However, when the pulse gate tube becomes non-conducting, then its plate resistance becomes very high for a brief interval; and during this time, a much larger share of the detector output voltage is found across the plate resistance of the tube. At this time, the gate is considered to be "open," since substantially no current flow occurs through tube 59. If an oscilloscope is applied to cathode 61, then the voltage relationship to ground is found to be as shown in the small inserted figure adjacent to the cathode wire 63. It is now found that the height of the central pip is related to the amplitude of the unbalance at that instant. The opening of the gate means that a large part of the detector output voltage to ground now appears across wire 63 to ground; while with gate closed only a small part of it appeared here.

By properly locating the position-detecting preparatory circuit 3 along the conveyor, the pulse gate has been caused to open at a preferred time, precisely when the article is properly located under electrode 12. The electrode is then carrying a value of current responsive to the nature or contents of the article, and the detector output is then also of a magnitude which also corresponds to these contents or nature. The output of the pulse gate, at the time interval for which the gate is open as shown by the central pip of the gate output, additionally corresponds in amplitude to these contents.

*Amplitude gate*

The pulse gate output 63 is now passed through capacitor 64 to remove the D.-C. portion of the output signal, and to permit substituting a preferred D.-C. voltage. A signal amplitude standard is obtained for this purpose by providing voltage-divider network 65, 66, 65', with 66 being a potentiometer so that a selected voltage may be applied at will to the slider 67. This slider is connected to resistor 68, diode 69 and resistor 70 in series to ground. It is to be observed that diode 69 is of high resistance, because it is so poled by the voltage from slider 67. The resistance of diode 69 is high compared to the selected value of resistors 68 and 70; and so it is possible to consider grid 71 of tube 72 to be at about ground potential and the reverse voltage across diode 69 to be determined by the setting of slider 67. As is well-known, diode 69 will now remain non-conducting until the reverse voltage is fully removed; and no current flow will occur unless the signal from pulse gate 59, of negative polarity, can pull sufficiently negative. This establishes an amplitude value for the pulse gate output, as compared with the setting of slider 67, above which diode 69 is conducting and below which it is not conducting. The signal at grid 71 is then found to represent the excess of signal on 63 above setting of slider 67; and it is represented in FIG. 3 line F and line G. This constitutes an "amplitude gate," capable of receiving an unbalance signal, comparing it with an acceptance level, and operating the output grid 71 in a negative direction whenever the unbalance signal is greater than the acceptance level. By choice, the gate is caused to open for a substandard article, and not for a standard article. Accordingly, row F of FIG. 3 shows the left-hand signal as being below the acceptance level of the gate and the right-hand signal as being above that level.

*Package deflector snapper and timed reset*

Triodes 72 and 73 comprise another form of multi-vibrator or snapper well known in the art, and arranged with a common cathode resistor 74 and a highly negative bias for the grid of triode 73 while grid 71 of triode 72 is not at all negative. In this way, triode 73 is normally non-conducting, while triode 72 is normally conducting. However, if a negative signal of sufficient amplitude is applied briefly to a grid 71, then this circuit responds as follows: triode 72 becomes non-conducting, causing its plate 75 to rise and draw grid 76 of triode 73 up with it. Triode 73 now becomes conducting, and this causes the cathodes 79 to rise in potential together. These changes have operated to make triode 72 non-controllable by its grid 71, since the cathode is now high in potential, well above the grid. As a result, the circuit remains in this state, with relay 77 energized, after the brief pulse applied to grid 71 has disappeared. After a time-delay adjusted by slider 85 of the negative bias system for grid 76, capacitor 80 will have charged sufficiently to allow grid 76 to return to a somewhat negative value, and the relay current will being to decrease. This will allow cathodes 79 to fall in potential; and when a critical value is reached, the regenerating action of these triodes will again take effect. Now, with cathodes 79 falling in potential, triode 72 will begin to carry current, plate 75 will begin to fall in potential, and regeneration will cause these effects to return rapidly to their original state, with triode 72 conducting.

The output signal of this second circuit closes an energizing circuit for a relay which in turn closes an energizing circuit for the article removing means. These means are shown by way of example only as a pipe 10 through which air under pressure is blown against the detected substandard article for forcibly ejecting the same from the conveyor line. The valve of this pressure line is controlled by a solenoid 11 in the aforementioned circuit of the article removing means. As is evident, the removal of a substandard article can be accomplished in various ways. For instance, the solenoid may be designed to cause a pushing effect upon the article to be removed. It is further possible and in some instances preferable not to remove a substandard article but to mark it for instance, by applying a dye spot blown against the article through a pipe such as pipe 10. Inasmuch as the ejection or other action upon a substandard article is slow in comparison with the inspection action proper, generally in the order of 50 milliseconds, the removal or marking effecting components in station 5 are given a time constant such that sufficient time is available to complete the operation. The self-resetting arrangement of the snapper circuit resets the article removing or marking station after it has operated for a sufficient period of time.

In the installation as hereinbefore described, the inspecting operation has been initiated by a photocell. However, as is evident other photoelectric devices can also be used such as a phototube. It has further been mentioned that the photoelectric tubes may be replaced by a device employing high frequency current for detecting the position of the article to be inspected. FIG. 4 shows such a high frequency type package position detector. When a package 2 under inspection passes between a detector electrode 12 and ground 7 the high frequency passing through the article generates an A.C. signal which is converted into a D.C. signal and has the shape shown in FIG. 4. This signal is fed to the snapper circuit associated with the package position detector. The function of an installation employing the position detector of FIG. 4 is otherwise the same as has been previously described in connection with FIGS. 1, 2 and 3.

As has been previously stated there is a nearly unlimited freedom as to the spacing of the articles to be inspected on the conveyor. They also need not to be uniformly spaced and the rate of speed of the conveyor need not to be uniform. Generally the rate of speed of the conveyor will be controlled essentially by the production and sorting requirements rather than by the demands of the inspection installation. However, the articles to be inspected should be reasonably accurately positioned in relation to the width of the conveyor. The degree of the required accuracy in positioning depends to a certain extent upon the required accuracy of the inspection, or in other words, a precision inspection demands a more accurate positioning than a relatively rough inspection. Positioning of the articles in relation to the width can be easily effected by means of side guides. FIG. 7 shows side guides 15 suitable for positioning an article 2 on conveyor 1. This figure also shows that the conveyor is grounded through its support brackets 16 as is generally customary. The area within which the inspection is carried out should have reasonably uniform characteristics. Adequate uniformity if lacking can be easily accomplished by providing a metal shield shielding the detector electrode from the area of non-uniformity.

FIG. 7 shows in detail the arrangement of an electrode for detecting the level in a container. The normal level of the container is indicated by a dashed line 17. In this connection it should be mentioned that the container may have any shape and may be made of any material except that it should not be a metal container which is closed on all sides. The detecting means proper are shown as two electrodes 18 and 19. These two electrodes are so positioned that their lower edge is at about the same level as the level of the container contents when normal. Both the electrodes and the contents of the container will conduct the high frequency current during the inspection. The only gap in the flow of the high frequency is the gap between the level of the contents and the nearest part of the electrodes. This gap is very small when the contents level is normal, but when the contents level is below the normal level the gap increases rapidly percentage wise. As a result, comparatively small changes in the normal contents level result in strong unbalance signals, or in other words, the arrangement of the electrodes as shown in FIG. 7 produces a highly sensitive response of the inspection circuits.

As appears from an examination of FIG. 7 and the description thereof, the electrode arrangement inspects in effect the unfilled part of the container only. When it is desired to inspect the contents of a container as to density or quantity present of say for instance, powderized material the entire container is inspected. FIG. 8 shows an electrode arrangement suitable for the purpose. According to this figure an electrode 20 is disposed above the top of the container so that the high frequency current flows through the entire article to the grounded conveyor.

As previously explained, the article is included in an arm of the bridge circuit of the installation the function of which has been explained in connection with FIGS. 1, 2 and 3.

FIG. 9 shows an electrode arrangement for detecting the presence or absence of a metal part of the article shown as a closure cap 21 of a bottle 22. The electrode 20 is arranged above the top of the closure cap as has been described in connection with FIG. 8. A grounded metal strip or shield 23 is disposed adjacent to the cap, or more specifically adjacent to the intended location of the cap. The high frequency current will pass from the electrode to ground and as is apparent, the balance of the bridge circuit will be controlled by the presence or absence of the cap.

It has been found advantageous to make the detecting electrodes somewhat longer than the article to be inspected in the direction of the movement of the conveyor and also somewhat wider than the article in the electrode arrangement according to FIGS. 8 and 9. Such protrusion of the electrodes beyond the length and width of the articles assures that the testing high frequency current penetrates the entire article since as previously mentioned the article is not entirely stationary during the inspection even though the distance of travel is a very small one. The electrodes are preferably made of light weight pieces of metal and mounted on a suitable insulator such as plastic or porcelain and care should be taken that the electrode will not appreciably vibrate with respect to the conveyor as any vibration involves a corresponding change in the spacing from the article and hence in the response of the installation.

For sake of simplicity and illustration, the articles to be inspected have been shown as being placed on a conveyor, however, the invention is not limited to the inspection of articles transported on a conveyor. As pointed out before, neither uniform spacing nor uniform rate of travel of the articles is essential. Accordingly, free falling articles or articles passing through a chute may be inspected in the manner previously described.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. An installation for inspecting the conformity of articles with a selected standard, said installation comprising, in combination, a triggering station, a detecting station, a rejection station, and means for guiding articles to be inspected sequentially past said stations, said rejection station including actuating means for acting upon articles detected to depart from said standard, said detecting station including comparing circuit means comparing an electrical property of each article to be inspected with a standard value of said electrical property and gating circuit means including normally closed gating means, said gating circuit means when closed blocking said comparing circuit means and actuating means, said triggering station including circuit means responsive to the passage of an article and connected with said gating circuit means to control said means in response to an article reaching a predetermined position in reference to the comparing circuit means, said circuit means in the triggering station generating signals controlling said gating circuit means for temporarily opening the gating means when an article to be inspected is in the predetermined position in reference to the comparing circuit means, said comparing circuit means generating signals for actuating said actuating means in the rejection station in response to the passage of a sub-standard article having a value of said electrical property departing from said standard, and said gating circuit means passing said signals to said actuating means for actuating the same.

2. An installation for inspecting the conformity of articles with a selected standard, said installation comprising, in combination, a triggering station, a detecting station, a rejection station, and means for guiding articles to be inspected sequentially past said stations, said rejection station including actuating means for acting upon articles detected to depart from said standard, said detecting station including comparing circuit means electronically comparing an electrical property of each article to be inspected with a standard value of said electrical property and gating circuit means including normally closed gating means, said gating circuit means when closed blocking said comparing circuit means and said actuating means, said triggering station including circuit means responsive to the passage of an article and connected with said gating circuit means to control said means in response to an article reaching a predetermined position in reference to the comparing circuit means, said circuit means in the triggering station generating signals controlling said gating circuit means for temporarily opening the gating means when an article to be inspected is in the predetermined position in reference to the comparing circuit means, a high frequency circuit connected with said comparing circuit means for energizing the same, said comparing circuit means being in balance in response to the passage of the comparing circuit means by a standard article and in unbalance in response to the passage of a sub-standard article having a value of said electrical property departing from said standard, said unbalance generating signals for actuating said actuating means in the rejection station and said gating circuit means passing said signals to said actuating means thereby actuating the same.

3. An installation for inspecting the conformity of articles with a selected standard, said installation comprising, in combination, a triggering station, a detecting station, a rejection station, and means for guiding articles to be inspected sequentially past said stations, said rejection station including actuating means for acting upon articles detected to depart from said standard, said detecting station including comparing circuit means electronically comparing an electrical property of each article to be inspected with a standard value of said electrical property and gating circuit means including normally closed gating means, said gating circuit means when closed blocking said comparing circuit means and said actuating means, said triggering station including circuit means responsive to the passage of an article and connected with said gating circuit means to control said means in response to an article reaching a predetermined position in reference to the comparing circuit means, said circuit means in the triggering station generating signals controlling said gating circuit means for temporarily opening the gating means when an article to be inspected is in a predetermined position in reference to the comparing circuit means, a high frequency circuit means connected with said comparing circuit means for energizing the same, said comparing circuit means including spaced-apart electrode means, said electrode means being positioned for passage of an article therebetween whereby the flow of high frequency current traverses said article during its passage, said comparing circuit means being in balance upon passage of a standard article and said flow of high frequency current causing an unbalance in response to a sub-standard article having a value of said electrical property departing from said standard, said unbalance generating corresponding signals for actuating said actuating means in the rejection station and said gating circuit means passing said signals to said actuating means thereby actuating the same.

4. An installation for inspecting the conformity of articles with a selected standard, said installation comprising, in combination, a triggering station, a detecting station, a rejection station, and means for guiding articles to be inspected sequentially past said stations, said rejection station including actuating means for acting upon articles detected to depart from said standard, said detecting station including comparing circuit means connected with said actuating means and electronically comparing an electrical property of each article to be inspected with a standard value of said electrical property and electronic gating circuit means including normally closed gating means, said gating circuit means when closed blocking said comparing circuit means and said actuating means, said triggering station including photoelectric means and electronic circuit means connected in circuit with said photoelectric means for control of the circuit means by a change in the incident light received by said photoelectric means due to the passage of an article to be inspected, said electronic circuit means being connected with said gating circuit means to control said means and generating signals temporarily opening the gating circuit means in response to an article to be inspected passing the position causing said change in the incident light, a high frequency circuit means connected with said comparing circuit means energizing the same, said comparing circuit means being in balance in response to the passage of the comparing means by a standard article and in unbalance in response to the passage of a substandard article having a value of said electrical property departing from said standard, said unbalance generating signals for actuating said actuating means in the rejection station, and said gating circuit means passing said signals to said actuating means thereby actuating the same.

5. An installation according to claim 4 wherein said photoelectric means control the comparing circuit means in the detecting station in a predetermined position of a passing article relative to said photoelectric means.

6. An installation according to claim 4, wherein said photoelectric means include a source of light projecting a beam of light across the path of movement of the articles to be inspected for intercepting the beam by and during the passage of an article, said circuit means in the triggering station being controlled for control of the comparing circuit means detecting station upon passage of an article out of the path of the beam.

7. An installation according to claim 2, wherein said electronic comparing circuit means include a bridge circuit, each article to be inspected being moved by said guide means into a position in which it is included in one of the arms of the bridge, the flow of high frequency through each article in the said position being indicative of the conformity of an article with said standard and controlling the balance of said bridge, an unbalance of the bridge in excess of a predetermined range causing said signals activating the actuating means in said rejection station.

8. An installation according to claim 1 and further comprising a second gating circuit means blocking unbalance signals other than signals having an amplitude differing from a predetermined acceptance level, signals above said acceptance level being caused by sub-standard articles and activating said actuating means in the rejection station.

9. An installation for inspecting the conformity of articles with a selected standard, said installation comprising, in combination, a triggering station, a detecting station, a rejection station including actuating means for acting upon sub-standard articles departing from said standard to a predetermined extent, and guide means for moving articles to be inspected sequentially past said stations, said triggering station including snapper circuit means energized in response to the passage of each article and generating signals having a fast wave front, and said detecting station including comparing circuit means electronically comparing an electrical property of an article to be inspected with a standard value of said electrical property, a high frequency energizing circuit energizing said comparing circuit means, said comparing circuit means including spaced-apart electrode means, said electrode means being positioned to include therebetween an article passing the detecting station in said comparing circuit means whereby the flow of high frequency current permeates the said article, the flow of high frequency through a substandard article causing an unbalance in said comparing circuit generating corresponding signals, and a gating circuit means responsive to said fast wave front signals to open a normally closed gate for the time interval said unbalance signals are generated to pass the said signals to said actuating means in the rejection station, and said actuating means in the rejection station being connected in a control circuit with said comparing circuit means for actuating said means for acting upon sub-standard articles in response to the unbalance signals passed by said gating circuit.

10. An installation according to claim 2, wherein said electronic comparing circuit means include a bridge circuit, each article to be inspected being moved by said guide means into a position in which it is included in one of the arms of the bridge, the flow of high frequency through each article in the said position being indicative of the conformity of an article with said standard and controlling the balance of said bridge, an unbalance of the bridge in excess of a predetermined range causing said signals activating said actuating means in the rejection station, and wherein said bridge arm comprises a stationary electrode means disposed adjacent to a selected portion of a passing article to be inspected, the high frequency current passing through the selected portion of the article.

11. An installation according to claim 10 for inspecting the level of the contents in a container, wherein said stationary electrode means is disposed approximately level with the desired level of the contents, said guide means constituting a second electrode means.

12. An installation according to claim 10 for inspecting the presence of a desired component of the article, wherein said stationary electrode means is disposed approximately in juxtaposition to a normal location of said article on one side thereof, and wherein a second stationary electrode is disposed approximately on the opposite side of the article, the high frequency flowing through the article and said two electrode means.

13. An installation according to claim 1, wherein said guide means comprise a grounded moving conveyor and a pair of stationary guide members disposed on opposite sides of the path of articles moving with said conveyor for retaining successive articles between the guide members in a predetermined lateral position relative to said comparing circuit means.

References Cited in the file of this patent

UNITED STATES PATENTS

| | | |
|---|---|---|
| 2,228,901 | Wilcox | Jan. 14, 1941 |
| 2,615,964 | Hubertz | Oct. 28, 1952 |
| 2,679,317 | Roop | May 25, 1954 |
| 2,734,628 | Schlayer | Feb. 14, 1956 |
| 2,742,150 | Rendel | Apr. 17, 1956 |
| 2,742,151 | Milford | Apr. 17, 1956 |

FOREIGN PATENTS

| | | |
|---|---|---|
| 642,321 | Germany | Mar. 3, 1937 |
| 647,020 | Germany | June 25, 1937 |